US011847783B2

(12) United States Patent
Obler et al.

(10) Patent No.: US 11,847,783 B2
(45) Date of Patent: Dec. 19, 2023

(54) PROVIDING A MASK IMAGE

(71) Applicant: Siemens Healthcare GmbH, Erlangen (DE)

(72) Inventors: Richard Obler, Erlangen (DE); Stanislav Tashenov, Heroldsbach (DE)

(73) Assignee: Siemens Healthcare GmbH, Erlangen (DE)

( * ) Notice: Subject to any disclaimer, the term of this patent is extended or adjusted under 35 U.S.C. 154(b) by 291 days.

(21) Appl. No.: 17/307,067

(22) Filed: May 4, 2021

(65) Prior Publication Data

US 2021/0350540 A1  Nov. 11, 2021

(30) Foreign Application Priority Data

May 7, 2020 (DE) ...................... 10 2020 205 762.1

(51) Int. Cl.
G06K 9/00 (2022.01)
G06T 7/11 (2017.01)
G06T 7/168 (2017.01)

(52) U.S. Cl.
CPC ................ *G06T 7/11* (2017.01); *G06T 7/168* (2017.01); *G06T 2207/20056* (2013.01); *G06T 2207/20224* (2013.01); *G06T 2207/30004* (2013.01)

(58) Field of Classification Search
CPC . G06T 2207/30004; G06T 2207/10072; G06T 2207/10116; G06T 7/11;

(Continued)

(56) References Cited

U.S. PATENT DOCUMENTS

2011/0317901 A1* 12/2011 Allmendinger ...... A61B 6/5288
                                                       382/131
2015/0279013 A1* 10/2015 Goossen ................ A61B 6/487
                                                       382/132

(Continued)

FOREIGN PATENT DOCUMENTS

DE    102010041443 A1 *  3/2012  ........... A61B 6/4441
DE    102010041443 A1     3/2012
WO       2014054018 A2    4/2014

OTHER PUBLICATIONS

Knutsson, Hans, et al. "Spatio-temporal filtering of digital angiography image data." Computer methods and programs in biomedicine 57.1-2 (1998): 115-123.*

(Continued)

*Primary Examiner* — Emily C Terrell
*Assistant Examiner* — Owais Iqbal Memon
(74) *Attorney, Agent, or Firm* — Lempia Summerfield Katz LLC

(57) ABSTRACT

A method and system for providing a mask image including receiving medical image data including a temporal dimension and generating a frequency data set including data points with in each case one frequency value by applying a Fourier transform to the image data. The Fourier transform is applied at least along the temporal dimension. The frequency data set is segmented into two sub-areas based on at least a frequency threshold value. The mask image is generated by applying an inverse Fourier transform to the first and/or the second sub-area of the frequency data set. The generated mask image is provided.

20 Claims, 7 Drawing Sheets

(58) Field of Classification Search
CPC .......... G06T 7/168; G06T 2207/20056; G06T 2207/20224; G06T 2207/10016; G06T 7/136; G06T 7/174; G06T 7/254; A61B 6/5211

See application file for complete search history.

(56) References Cited

U.S. PATENT DOCUMENTS

2016/0278727 A1* 9/2016 Baruth ................. A61B 6/5235
2020/0341100 A1* 10/2020 Heukensfeldt Jansen .................. G06T 11/008

OTHER PUBLICATIONS

German Office Action for German Application No. 10 2020 205 762.1 dated Feb. 26, 2021.

* cited by examiner

PROVIDING A MASK IMAGE

CROSS REFERENCE TO RELATED APPLICATIONS

This application claims the benefit of DE 102020205762.1, filed on May 7, 2020 which is hereby incorporated by reference in its entirety.

FIELD

Embodiments relates to a method for providing a mask image and to a method for providing a differential image.

BACKGROUND

X-ray-based subtraction methods are frequently applied for detection of a change over time at a body region of an examination object, for example a movement of a medical object at the body region. A change over time at the body region of the examination object may include, for example a spreading movement of a contrast medium in a vessel system and/or a movement of a surgical and/or diagnostic instrument.

With the X-ray-based subtraction methods, two X-ray images acquired in chronological sequence, that map the same body region, are conventionally subtracted from each other. The elements in the X-ray images that are irrelevant and/or disruptive to a treatment and/or diagnosis, which elements, for example, do not vary over time, are reduced.

With methods such as digital subtraction angiography (DSA), the acquisition is often different in two phases. In a first phase, the mask phase, conventionally at least one X-ray image with optimum image quality, for example maximum X-ray radiation dose, is acquired. In a second phase, the fill phase, conventionally at least one second X-ray image is acquired. A change at the examined body region of the examination object has taken place at this instant. A plurality of second X-ray images is frequently successively acquired in a short chronological sequence for a detection of this change over time at the body region. The change over time at the body region may then be rendered visible by a subtraction of one X-ray image from the first phase and one of the second X-ray images from the second phase. The known DSA methods are frequently based on the assumption of a uniform movement of different tissue regions and bony structures in the body region. A DSA method often cannot be applied in the case of a difference between the respective movements. In addition, the examination object is adversely exposed to a high X-ray radiation dose in the mask phase.

Furthermore, image processing algorithms exist, that frequently amplify associated spatial frequencies in medical image data in order to highlight medical objects and/or specific anatomical structures, for example a vessel section, and/or attenuate spatial frequencies of interfering structures, for example a bone structure. Disadvantageously the medical objects and/or anatomical structures to be highlighted are often attenuated or the interfering structures are amplified, however, for example in fields of view where mutual overlaying occurs.

BRIEF SUMMARY AND DESCRIPTION

The scope of the present invention is defined solely by the appended claims and is not affected to any degree by the statements within this summary. The present embodiments may obviate one or more of the drawbacks or limitations in the related art.

Embodiments provide masking of image fractions of different movement states.

Embodiments include a method, for example a computer-implemented method, for providing a mask image. In a first step a), medical image data including a temporal dimension is received. Furthermore, in a second step b), a frequency data set including data points with in each case one frequency value is generated by applying a Fourier transform to the image data. The Fourier transform is applied at least along the temporal dimension. In a third step c), the frequency data set is segmented into two sub-areas on the basis of at least one frequency threshold value. The mask image is generated in a fourth step d) by applying an inverse Fourier transform to the first and/or the second sub-area of the frequency data set. In a fifth step e), the mask image is provided.

The above-described steps a) to e) may be carried out successively and/or at least partially simultaneously.

Receiving the image data in step a) may include, for example, capturing and/or reading a computer-readable data memory and/or receiving from a data memory unit, for example a database. Furthermore, the image data may be provided by a provision unit of a medical imaging device.

The image data may be spatially resolved, for example, two-dimensionally and/or three-dimensionally. In addition, the image data is temporally resolved. the image data may map at least partially a joint examination region of an examination object. The examination object may be, for example, a human and/or animal patient and/or a phantom. The image data may include, for example, X-ray images, for example projection images, and/or ultrasound images and/or computed tomography images and/or magnetic resonance images and/or positron emission tomography images. The image data may map the examination region at different instants, moreover, for example acquisition instants. Consequently, the image data is resolved both spatially and temporally. This may ensure that a change over time at the examination region, for example a spreading movement of a contrast medium and/or a movement of a medical and/or anatomical object, is mapped in the image data. Furthermore, the image data may include metadata, wherein the metadata may include, for example, information relating to an acquisition parameter and/or operating parameter of the medical imaging device.

For example, the image data may include a plurality of individual images. The image data, for example the individual images, may include a plurality of image points, for example pixels and/or voxels. In each case an image point of the image data may include a time intensity curve along the temporal dimension.

The Fourier transform for generating the frequency data set in step b) may include, for example, a windowed Fourier transform, for example a short-time Fourier transform (STFT), and/or a wavelet transform. The windowed Fourier transform may include, for example, a rectangular function and/or a Hanning window function and/or a Gaussian window function. Furthermore, the windowed Fourier transform may be implemented as a fast Fourier transform (FFT). The frequency data set may be generated by applying the Fourier transform to the spatially and temporally resolved image data at least along the temporal dimension. The data points of the frequency data set may correspond to one image point in each case of the image data. For example, the frequency data set may also be spatially resolved. Furthermore, the data points of the frequency data set may each include frequency information relating to the time intensity curve of the respectively corresponding image point of the image data. The frequency information of one data point in each case may include, for example, a frequency spectrum relating to the time intensity curve of the image point corresponding therewith. When applying a short-time Fourier transform to the image data this may include a window function for classification of the image data, for example of time intensity curves of the image points, in time segments along the temporal dimension. The time segments in corresponding regions of the frequency spectrum of the frequency data set may be transferred to the image data by applying the short-time Fourier transform. Transitions, for example transition frequencies, between different movement states, that are mapped in the image data in a temporally resolved manner, may be reliably and precisely determined in the frequency data set hereby, for example by an analysis of the frequency spectrum.

A resolution along the temporal dimension and a frequency resolution in the respective time segments or the regions of the frequency spectrum corresponding therewith are optimized by applying a wavelet transform to the image data for generation of the frequency data set. This is made possible, for example, by a simultaneous shifting and scaling of the window function in the case of the wavelet transform. For example, applying the short-time Fourier transform and/or the wavelet transform in step b) provides, for example continuous, adjusting of the time segments or the regions of the frequency spectrum corresponding therewith. This is advantageous, for example, for repeated performance of steps a) to e).

In step c), the frequency data set may be segmented into two sub-areas on the basis of at least one frequency threshold value. The frequency threshold value may be specified, for example, as a transition frequency between two different movement states. The movement states may each include a different movement speed. The frequency values may describe a change over time in the time intensity curves of the image points of the image data. In addition, the segmenting may include a classification of sub-areas, for example data points, of the frequency data set whose frequency value, for example a frequency mean, is in each case less than and/or more than the frequency threshold value. For example, the frequency data set may be classified by the segmenting into a first sub-area including frequency values less than and/or equal to the frequency threshold value and a second sub-area including frequency values more than and/or equal to the frequency threshold value. The data points of the first sub-area may correspond, for example, to image points of the image data, that map static and/or slow-changing sections of the examination region. Furthermore, the data points of the second sub-area may correspond to image points of the image data, that map comparatively fast-changing sections of the examination region. The difference between the static and/or slow-changing sections and the comparatively fast-changing sections may be based on the frequency threshold value. For example, the classification of the frequency data set into the first and the second sub-areas may be set by the frequency threshold value.

In step d), the mask image may be generated by applying an inverse Fourier transform to the first and/or the second sub-area of the frequency data set. On an application of the inverse Fourier transform to the first and the second sub-areas of the frequency data set the frequency values of at least one of the sub-areas may be adjusted in step c). If the frequency data set was generated by applying a wavelet transform in step b), the inverse Fourier transform in step d) may include, for example, a wavelet synthesis. The mask image includes a plurality of image points. Each image point of the mask image corresponds to a data point of the frequency data set. The mask image may include, for example, the same or a lower dimensionality than the image data. the mask image may include masked and unmasked fields of view. The image points of the respective field of view may correspond to the data points of one sub-area in each case of the segmented frequency data set.

On generation of the mask image by applying the inverse Fourier transform to the first sub-area of the frequency data set the image points of the unmasked field of view of the mask image may correspond to the data points of the first sub-area of the frequency data set. The unmasked fields of view of the mask image may correspond, for example, to image points of the image data, therefore, that image points map static and/or slow-changing sections of the examination region. Furthermore, the masked fields of view of the mask image may correspond, for example, to image points of the image data, that image points map comparatively fast-changing sections of the examination region.

Analogously thereto the image points of the unmasked field of view of the mask image correspond to the data points of the second sub-area of the frequency data set if the mask image is generated by applying the inverse Fourier transform to the second sub-area of the frequency data set.

Furthermore, the mask image may include a plurality of individual mask images. The individual mask images correspond in each case to one individual image of the image data. Furthermore, generating the mask image in step d) may include an, for example adaptive and/or a weighted, averaging of the individual mask images, for example along the temporal dimension. The averaging mask image generated in the process may be provided, for example, as the mask image in step e).

Providing the mask image in step e) may include, for example, storing on a computer-readable storage medium and/or displaying on a presentation unit and/or transferring to a provision unit. For example, a graphical representation of the mask image on the presentation unit may be displayed. The mask image may be provided, for example, for a method for providing a differential image.

The method provides a classification, for example masking, of image fractions of different movement states based on an analysis, for example a comparison, of frequency values, which frequency values are obtained from the image data by Fourier transform. The acquisition of a mask image may be omitted hereby, so an overall duration of the examination and/or an exposure of the examination object, for example due to an X-ray dose, may be reduced. In addition, varying, for example anatomical, structures and/or medical objects, that are mapped in the image data, may be retained, for example in contrast to an intensity-based masking.

In an embodiment, the inverse Fourier transform may be applied in step d) to the first and the second sub-areas of the frequency data set. The frequency values of at least one of the sub-areas may be adjusted, for example before application of the inverse Fourier transform.

Adjusting the frequency values may include, for example, filling the at least one sub-area with predetermined, for example constant, frequency values. The at least one sub-area, for example the frequency values of the at least one sub-area, may be filled, for example, with zeros (zero filling). Alternatively, or in addition, the frequency values of the at least one sub-area may be filled and/or adjusted, for example scaled, according to a specified distribution function, for example a window function and/or attenuation function. This may provide the application of the inverse Fourier transform to the first and the second sub-areas of the frequency data set while retaining the segmenting. Furthermore, the mask image may be generated on the basis of the adjusted frequency values of the at least one sub-area in such a way that it has the unmasked and masked fields of view according to the segmenting in step c).

In an embodiment, the Fourier transform may also be applied in step b) along at least one spatial axis. Segmenting of the frequency data set in step c) may be based on at least one first frequency threshold value in respect of a temporal frequency and at least one second frequency threshold value in respect of a spatial frequency.

The Fourier transform in step b) may be applied, for example, in a staggered and/or multi-dimensional manner. For example, the Fourier transforms may be successively applied to the image data along the temporal dimension and along the at least one spatial axis. Alternatively, or in addition, the Fourier transform may include a multidimensional design along the temporal dimension and along the at least one spatial axis. The inverse Fourier transform in step d) may be configured analogously to the Fourier transform. For example, the Fourier transform may be applied along at least one, for example all, of the spatial dimensions of the image data.

Applying the Fourier transform additionally along the at least one spatial axis, the frequency values of the data points of the frequency data set may describe both a temporal and a spatial change in intensity of the image points of the image data. For example, the frequency values of the data points of the frequency data set may include a time frequency and a spatial frequency in each case, for example as tuples. The first frequency threshold value may be specified in respect of the temporal frequency and the second frequency threshold value in respect of the spatial frequency. The comparison condition for segmenting the frequency data set in step c) may include in each case an adequate or a necessary criterion in respect of the first and of the second frequency threshold value.

In one configuration, the comparison condition for segmenting may include an adequate criterion. The frequency data set may be classified by segmenting into a first sub-area including frequency values less than and/or equal to the first frequency threshold value or less than and/or equal to the second frequency threshold value and in a second sub-area including frequency values more than and/or equal to the first frequency threshold value and more than and/or equal to the second frequency threshold value. The data points of the first sub-area may correspond, for example, to image points of the image data, that image points map temporally or spatially static and/or temporally or spatially slow-changing sections of the examination region. Furthermore, the data points of the second sub-area correspond to image points of the image data, that image points temporally and spatially map fast-changing sections of the examination region.

In another configuration, the comparison condition for segmenting may include a necessary criterion. The frequency data set may be classified by segmenting into a first sub-area including frequency values less than and/or equal to the first frequency threshold value and less than and/or equal to the second frequency threshold value and in a second sub-area including frequency values more than and/or equal to the first frequency threshold value or more than and/or equal to the second frequency threshold value. The data points of the first sub-area may correspond, for example, to image points of the image data, that image points map temporally and spatially static and/or temporally and spatially slow-changing sections of the examination region. Furthermore, the data points of the second sub-area correspond to image points of the image data, that image points temporally or spatially map fast-changing sections of the examination region.

Temporal and spatial changes, for example a movement, in the examination region, that are mapped in the image data, may be segmented hereby according to the specification of the first and the second frequency threshold values, for example the first and/or the second sub-area may be segmented according to an ellipsoid. The difference between the first frequency threshold value in respect of the temporal frequency and the second frequency threshold value in respect of the spatial frequency may specify a type of temporal change to be segmented, for example a movement direction and/or a change in intensity in the case of a flow of contrast medium.

In an embodiment, the method may also include steps a2) and a3). In step a2), a medical object and/or an anatomical structure may be identified in the image data. Furthermore, in step a3), data points may be determined in the frequency data set, which points correspond to the identified medical object and/or the anatomical structure. The corresponding data points may be excluded from the segmenting in step c). Steps a2) and a3) may be carried out, for example, after step a) and before step b) of the method.

The medical object may be configured, for example, as a surgical and/or diagnostic instrument, for example a catheter and/or guide wire and/or endoscope. In addition, the medical object may be configured as a contrast medium, for example a contrast medium bolus, arranged in the examination region. Furthermore, the anatomical structure may include, for example a vessel structure, for example a vessel section, and/or an organ, for example a hollow organ, and/or a tissue boundary. For example, the medical object may be arranged at least partially in the anatomical structure.

Identifying the medical object and/or the anatomical structure in the image data in step a2) may include, for example, segmenting a mapping of the medical object and/or the anatomical structure in the image data. Segmenting of the medical object and/or the anatomical structure may be based, for example, on a comparison of the image values of the image points with a specified threshold value. Alternatively, or in addition, the medical object and/or the anatomical structure may be identified, for example, on the basis of a form, for example a contour. Alternatively, or in addition, the medical object and/or the anatomical structure may be identified on the basis of at least one marker structure, which marker structure is mapped in the image data. Furthermore, identifying the medical object and/or the anatomical structure may include annotating image points of the image data, for example by way of a user input. In step a2), for example the image points may be identified in the image data, which image points map the medical object and/or the anatomical structure.

In step a3), the data points may be identified in the frequency data set, which data points correspond to the image points in the image data identified in step a2). This may take place, for example, on the basis of a mapping rule between the image points of the image data and the data points of the frequency data set when applying the Fourier transform.

The corresponding data points may be excluded from the segmenting in step c). The fields of view, for example the image points, that were identified in step a3), may be specified as unmasked fields of view for the mask image. The medical object and/or the anatomical structure identified in step a2) is retained as an unmasked field of view on an application, for example subtraction and/or multiplication, of the mask image.

Steps a2) and a3) may be carried out after step a) and before step b).

In an embodiment, a subset of data points of the frequency data set around the corresponding data points may also be determined in step a3), which subset is excluded from the segmenting in step c).

The subset of data points of the frequency data set around the corresponding data points may be determined, for example, on the basis of a distribution function, for example a spatial one. Alternatively, or in addition, the subset may include the data points of the frequency data set, which data points are located within a specified spatial distance from the corresponding data points. Alternatively, or in addition, a subset of image points may be determined whose image points are located within the specified spatial distance from the image points identified in step a2). Hereafter the corresponding data points may be determined on the basis of the identified image points and the subset of data points on the basis of the subset of image points. A safety margin, for example a spatial one, may be determined around the image points hereby, that map the medical object and/or the anatomical structure, which margin is excluded from the segmenting and for example from a subsequent masking. The sub-area of the data points of the frequency data set may be specified analogously to the corresponding data points as an unmasked field of view for the mask image. The mapping of the medical object and/or the anatomical structure may be retained hereby, for example completely, as an unmasked field of view also on application, for example subtraction and/or multiplication, of the mask image.

In an embodiment, step a) may also include receiving an object parameter and/or a structure parameter. The object parameter may include information relating to the medical object and/or the structure parameter information relating to the anatomical structure. Furthermore, the corresponding data points may be determined in step a3) on the basis of the object parameter and/or the structure parameter.

Receiving the object parameter and/or the structure parameter may include, for example, capturing and/or reading a computer-readable data memory and/or receiving from a data memory unit, for example a database. Furthermore, the object parameter and/or the structure parameter may be provided by a provision unit of a medical imaging device. Alternatively, or in addition, the object parameter and/or the structure parameter may be identified on the basis of a user input at an input unit.

The object parameter may include information relating to the medical object, for example at least one operating parameter and/or a material property and/or a form property and/or information relating to a marker structure arranged on the medical object. The structure parameter may also include information relating to anatomical structure, for example a tissue parameter and/or a physiological parameter and/or information relating to a marker structure arranged on the anatomical structure and/or information relating to a contrast medium arranged in the anatomical structure. Furthermore, the structure parameter may include geometric information, for example a central line and/or a volume network model and/or spatial spread information, relating to the anatomical structure. The image points of the image data, that image points map the medical object and/or the anatomical structure, may be identified reliably and in a computationally efficient manner hereby. For example, after identification of at least part of the medical object and/or the anatomical structure the remaining mapping may be identified on the basis of the object parameter and/or the structure parameter, for example by virtual completion. Hereafter, corresponding data points of the frequency data set may be identified on the basis of the identified image points of the image data.

Alternatively, or in addition, the corresponding data points of the frequency data set may be identified on the basis of a comparison of the respective frequency values with the object parameter and/or the structure parameter.

Determining the corresponding data points in step a3) based on the object parameter and/or the structure parameter may provide reliably and in a simultaneously computationally efficient manner that the mapping of the medical object and/or the anatomical structure is retained also on application, for example a subtraction and/or multiplication, of the mask image.

In an embodiment, step a) may also include registering the medical image data, for example the individual images. The image data, for example the individual images, may be registered relative to each other along the temporal dimension. Registering the image data may include a rigid and/or non-rigid transformation of the individual images, for example relative to a reference individual image and/or relative to each other. Alternatively, or in addition, registering the image data may include a movement correction, for example based on a physiological movement signal of the examination object. A deviation of the individual images relative to each other, for example due to a movement of the examination object, may be reduced hereby. the accuracy and reliability of the segmenting of the frequency data set in step c) may be improved hereby.

In an embodiment, the medical image data may map at least partially a joint examination region of an examination object. Step a) may also include receiving a physiological signal and/or a movement signal of the examination object. In addition, the at least one frequency threshold value may be specified in step c) on the basis of the physiological signal and/or the movement signal.

Receiving the physiological signal and/or the movement signal may include, for example, capturing and/or reading a computer-readable data memory and/or receiving from a data memory unit, for example a database. Furthermore, the physiological signal and/or the movement signal may be provided by a provision unit of a medical imaging device and/or by a sensor unit for monitoring the examination object.

The physiological signal may include, for example, a heart signal, for example a pulse signal, and/or a respiratory signal of the examination object. Furthermore, the movement signal may include spatially and temporally resolved movement information of at least part of the examination object, for example of the examination region. The frequency threshold value may be specified on the basis of the physiological signal and/or the movement signal in such a way that the frequency values of the data points of the frequency data set, that correspond to a change over time, for example a movement, of the examination region, that change over time at least partially follows the physiological signal and/or the movement signal, are more than and/or equal to the frequency threshold value. The fields of view of the image data, that map the change over time of the examination region, may correspond to an unmasked field of view of the mask image hereby. This may provide that a change over time at the examination region, which change over time at least partially follows the physiological signal and/or the movement signal, is retained also on an application, for example subtraction and/or multiplication, of the mask image.

Embodiments include a method for providing a differential image. In a first step s1), medical image data including a temporal dimension is acquired by a medical imaging device. In a second step s2), a mask image is received by applying an embodiment of the method for providing a mask image to the medical image data. In a third step s3), the differential image is generated by subtracting and/or multiplying the mask image and the medical image data. The differential image is provided in a fourth step s4).

The advantages of the method for providing a differential image substantially correspond to the advantages of the method for providing a mask image. Features, advantages or alternative embodiments mentioned in this connection may likewise be transferred to the other claimed subject matters and vice versa.

The medical imaging device for acquisition of the medical image data in step s1) may be configured, for example, as a medical X-ray device, for example C-arm X-ray device, and/or as a computed tomography system (CT) and/or as a sonography device and/or as a positron emission tomography system (PET). The medical image data acquired in step s1) may also be provided for step a) of the method for providing a mask image. Generating the differential image in step s3) may include a subtraction and/or multiplication, for example image point-wise and/or individual image-wise, of the mask image by the medical image data. Masked fields of view of the mask image may be removed from the medical image data hereby. The differential image has the unmasked fields of view of the mask image.

Providing the differential image in step s4) may include, for example, storing on a computer-readable storage medium and/or displaying on a presentation unit and/or transferring to a provision unit. For example, a graphical representation of the differential image may be displayed on the presentation unit.

Embodiments provide a provision unit including an arithmetic unit, a memory unit and an interface. A provision unit may be configured to carry out the above-described methods for providing a mask image and/or for providing a differential image, and their aspects. The provision unit is configured to carry out the methods and their aspects in that the interface, memory unit and arithmetic unit are configured to carry out the corresponding method steps.

For example, the interface may be configured for carrying out steps a), a2), a3) and/or e) of the method for providing a mask image. Furthermore, the interface may be configured for carrying out steps s2) and s4) of the method for providing a differential image. Furthermore, the arithmetic unit and/or the memory unit may be configured for carrying out the remaining steps of the method.

The advantages of the provision unit substantially correspond to the advantages of the method for providing a mask image and/or for providing a differential image. Features, advantages or alternative embodiments mentioned in this connection may likewise be transferred to the other claimed subject matters and vice versa.

Embodiments provide a medical imaging device including a provision unit. The medical imaging device, for example the provision unit, is configured for carrying out a method for providing a mask image and/or for providing a differential image. For example, the medical imaging device may be configured as a medical X-ray device, for example C-arm X-ray device, and/or as a computed tomography system (CT) and/or as a sonography device and/or as a positron emission tomography system (PET). The medical imaging device may also be configured for acquisition and/or for receiving and/or for providing the medical image data and/or the mask image and/or the differential image.

The advantages of the medical imaging device substantially correspond to the advantages of the method for providing a mask image and/or for providing a differential image. Features, advantages or alternative embodiments mentioned in this connection may likewise be transferred to the other claimed subject matters and vice versa.

Embodiments provide a computer program product with a computer program, that may be loaded directly into a memory of a provision unit, with program segments in order to carry out all steps of the method for providing a mask image and/or for providing a differential image when the program segments are executed by the provision unit. The computer program product may include software with a source code, that still has to be compiled and linked or that only has to be interpreted, or an executable software code, that for execution only has to be loaded into the provision unit. As a result of the computer program product the method for providing a mask image and/or the method for providing a differential image by a provision unit may be carried out quickly, repeatedly in an identical manner and robustly. The computer program product is configured such that it may carry out the method steps by the provision unit.

The computer program product is stored, for example, on a computer-readable storage medium or saved on a network or server from where it may be loaded into the processor of a provision unit, that may be directly connected to the provision unit or be configured as part of the provision unit. Furthermore, control information of the computer program product may be stored on an electronically readable data carrier. The control information of the electronically readable data carrier may be configured in such a way that it carries out a method when the data carrier is used in a provision unit. Examples of electronically readable data carriers are a DVD, a magnetic tape or a USB stick on which electronically readable control information, for example software, is stored. When this control information is read from the data carrier and stored in a provision unit, embodiments of the above-described method may be carried out.

Embodiments may also start from a computer-readable storage medium and/or electronically readable data carrier on which program segments, that may be read and executed by a provision unit, are stored in order to carry out all steps of the method for providing a mask image and/or for providing a differential image when the program segments are executed by the provision unit.

An implementation in terms of software includes the advantage that previously used provision units may also be easily retrofitted by way of a software update in order to work. Apart from the computer program a computer program product of this kind may optionally include additional elements, such as documentation and/or additional components, as well as hardware components, such as hardware keys (dongles, etc.) in order to use the software.

DETAILED DESCRIPTION

Figure 1:
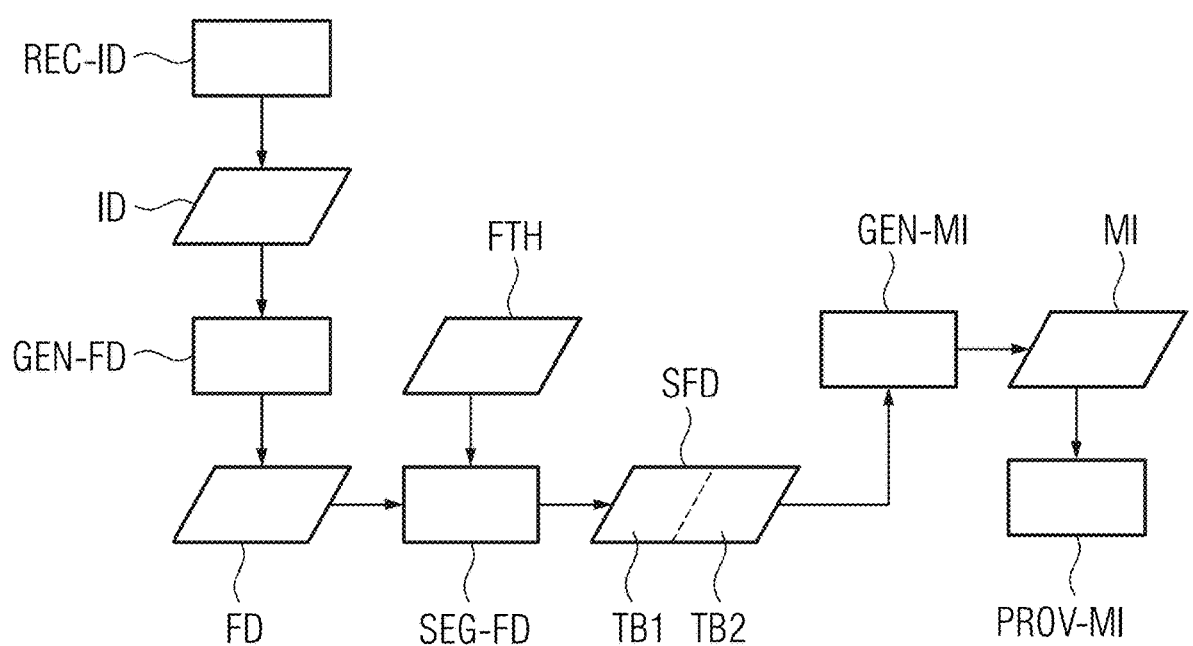
FIGS. 1, 2, 3, and 4 depict schematic representations of different embodiments of a method for providing a mask image.

FIG. 1 schematically represents an embodiment of the method for providing a mask image. In a first step a), medical image data ID including a temporal dimension may be received REC-ID. Furthermore, in a second step b), a frequency data set FD including data points with in each case one frequency value may be generated GEN-FD by applying a Fourier transform to the image data ID. The Fourier transform may be applied at least along the temporal dimension. In a third step c), the frequency data set FD may be segmented SEG-FD into two sub-areas TB1 and TB2 on the basis of at least one frequency threshold value FTH. The segmented frequency data set SFD may be provided in the process. In a fourth step d), the mask image MI may be generated GEN-MI by applying an inverse Fourier transform to the first TB1 and/or the second sub-area TB2 of the frequency data set FD. Furthermore, the mask image MI may be provided PROV-MI in a fifth step e).

The Fourier transform for generating GEN-FD the frequency data set FD in step b) may include, for example, a windowed Fourier transform, for example a short-time Fourier transform (STFT), and/or a wavelet transform. The windowed Fourier transform may include, for example, a rectangular function and/or a Hanning window function and/or a Gaussian window function. Furthermore, the windowed Fourier transform may be implemented as a fast Fourier transform (FFT).

Furthermore, the frequency data set FD may be classified by the segmenting SEG-FD into the first sub-area TB1 including frequency values less than and/or equal to the at least one frequency threshold value FTH and a second sub-area TB2 including frequency values more than and/or equal to the frequency threshold value FTH. The data points of the first sub-area TB1 may correspond, for example, to image points of the image data ID, that map static and/or slow-changing sections of the examination region UB, for example a bone structure. Furthermore, the data points of the second sub-area TB2 may correspond to image points of the image data ID, that map comparatively fast-changing sections of the examination region UB, for example a medical object arranged therein and/or a contrast medium and/or a moved anatomical structure.

The mask image MI may include masked and unmasked fields of view. The image points of the respective field of view may correspond to the data points of one sub-area TB1, TB2 in each case of the segmented frequency data set SFD.

With a generation GEN-MI of the mask image MI by applying the inverse Fourier transform to the first sub-area TB1 of the frequency data set FD the image points of the unmasked field of view of the mask image MI may correspond to the data points of the first sub-area TB1 of the frequency data set FD. The unmasked fields of view of the mask image MI may correspond, for example, to image points of the image data ID, that map temporally static and/or slow-changing sections of the examination region UB, therefore. Furthermore, the masked fields of view of the mask image MI may correspond, for example, to image points of the image data ID, that map comparatively fast-changing sections of the examination region UB.

Furthermore, the inverse Fourier transform may be applied in step d) for example to the first TB1 and the second sub-area TB2 of the segmented frequency data set SFD, with the frequency values of at least one of sub-areas TB1 and/or TB2 being adjusted.

In addition, the Fourier transform in step b) may be applied along at least one spatial axis. Segmenting of the frequency data set SEG-FD in step c) may be based on at least one first frequency threshold value in respect of a temporal frequency and at least one second frequency threshold value in respect of a spatial frequency.

Figure 2:
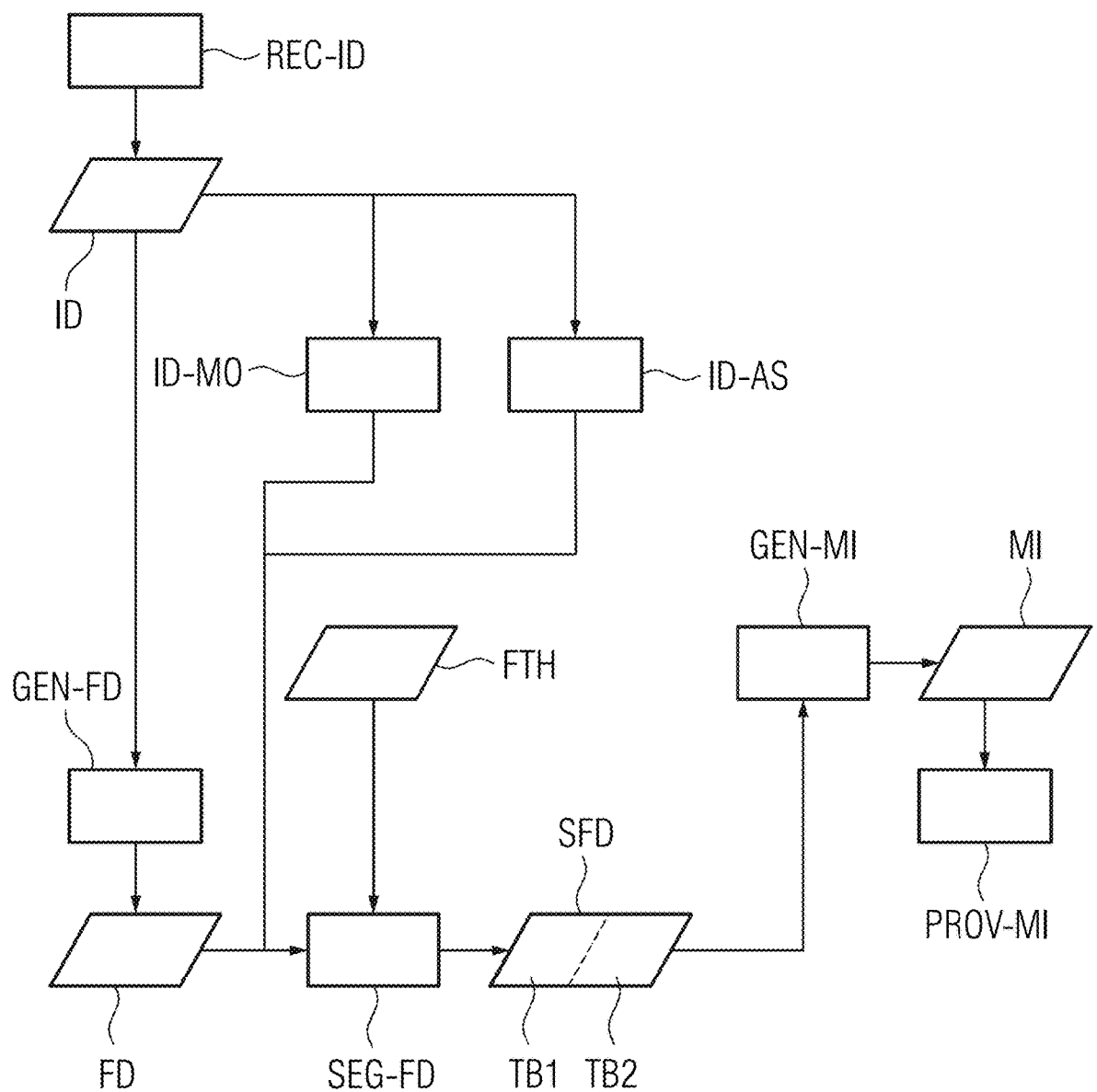

FIG. 2 depicts a schematic representation of an embodiment of the method for providing a mask image PROV-MI. The method may also include steps a2) and a3). Step a2) may include identifying a medical object ID-MO and/or an anatomical structure ID-AS in the image data ID. Furthermore, in step a3), corresponding data points may be identified in the frequency data set FD, that correspond to the identified medical object and/or the anatomical structure. The corresponding data points may be excluded from the segmenting SEG-FD in step c).

Furthermore, in step a3), a subset of data points of the frequency data set FD around the corresponding data points may also be determined, which subset is excluded from the segmenting SEG-FD in step c).

Figure 3:
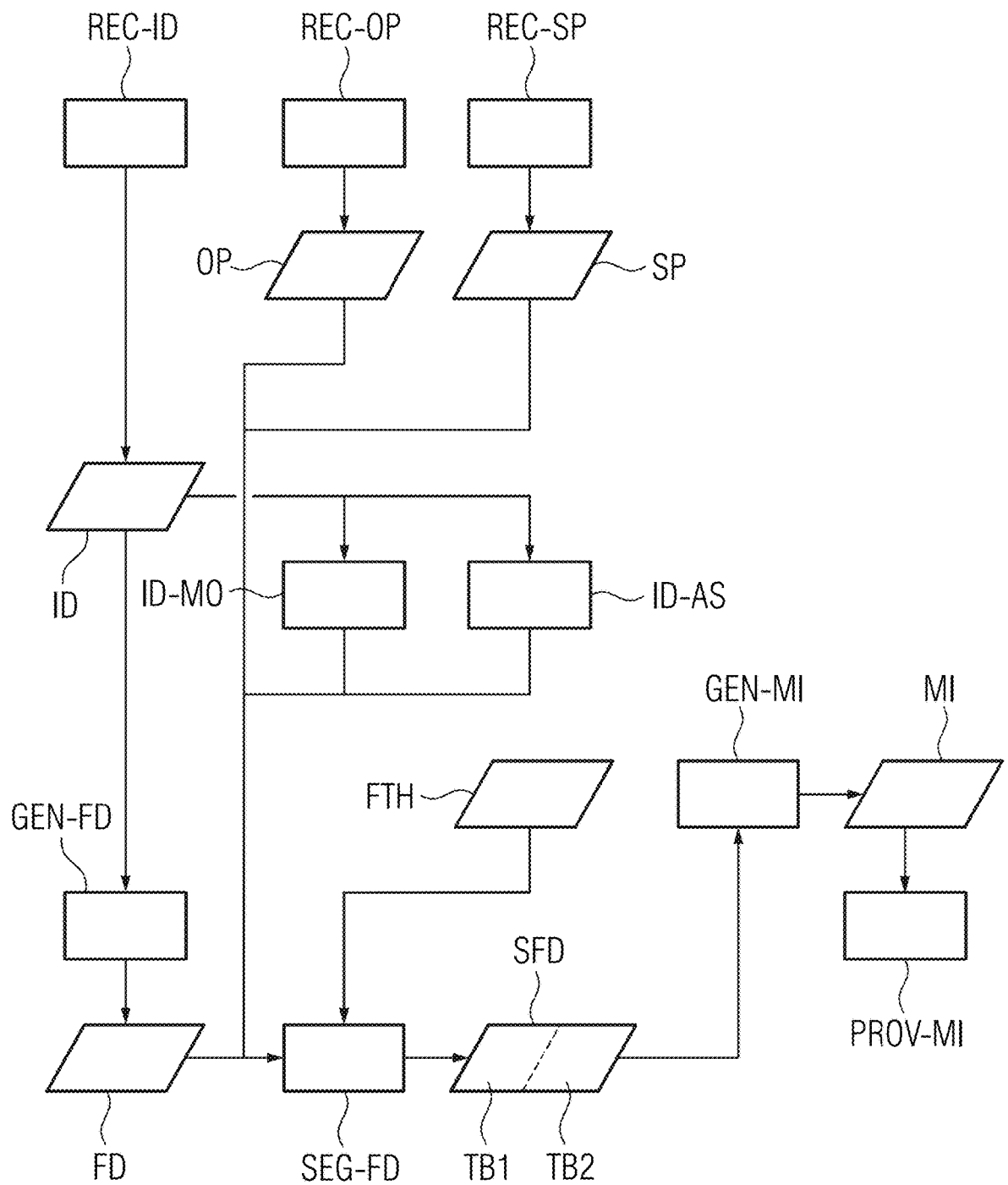

FIG. 3 schematically represents an embodiment of the method for providing a mask image PROV-MI. Step a) may also include receiving an object parameter REC-OP and/or a structure parameter REC-SP. The object parameter OP may include information relating to the medical object. Furthermore, the structure parameter SP may include information relating to the anatomical structure. the corresponding data points may be determined in step a3) on the basis of the object parameter OP and/or the structure parameter SP.

Figure 4:
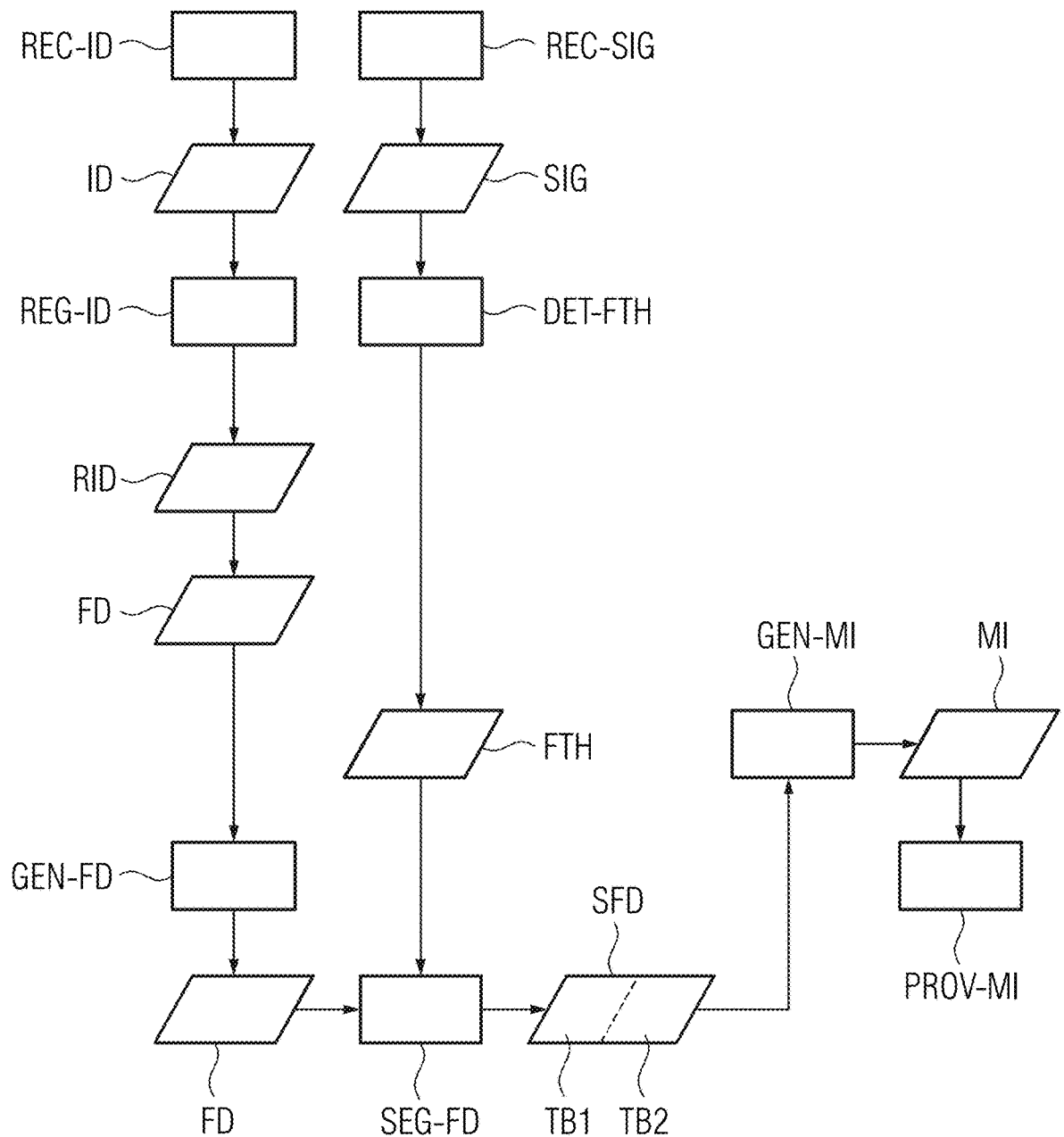

FIG. 4 depicts a schematic representation of an embodiment of the method for providing a mask image PROV-MI. Step a) may also include registering the medical image data REG-ID. Registered medical image data RID may be provided hereafter for step a2) and/or step b). The medical image data ID, for example along the temporal dimension including a plurality of individual images, may map a joint examination region of an examination object. Step a) may also include receiving REC-SIG a physiological signal and/or a movement signal SIG of the examination object. Furthermore, the at least one frequency threshold value FTH may be specified DET-FTH in step c) on the basis of the physiological signal and/or the movement signal SIG.

Figure 5:
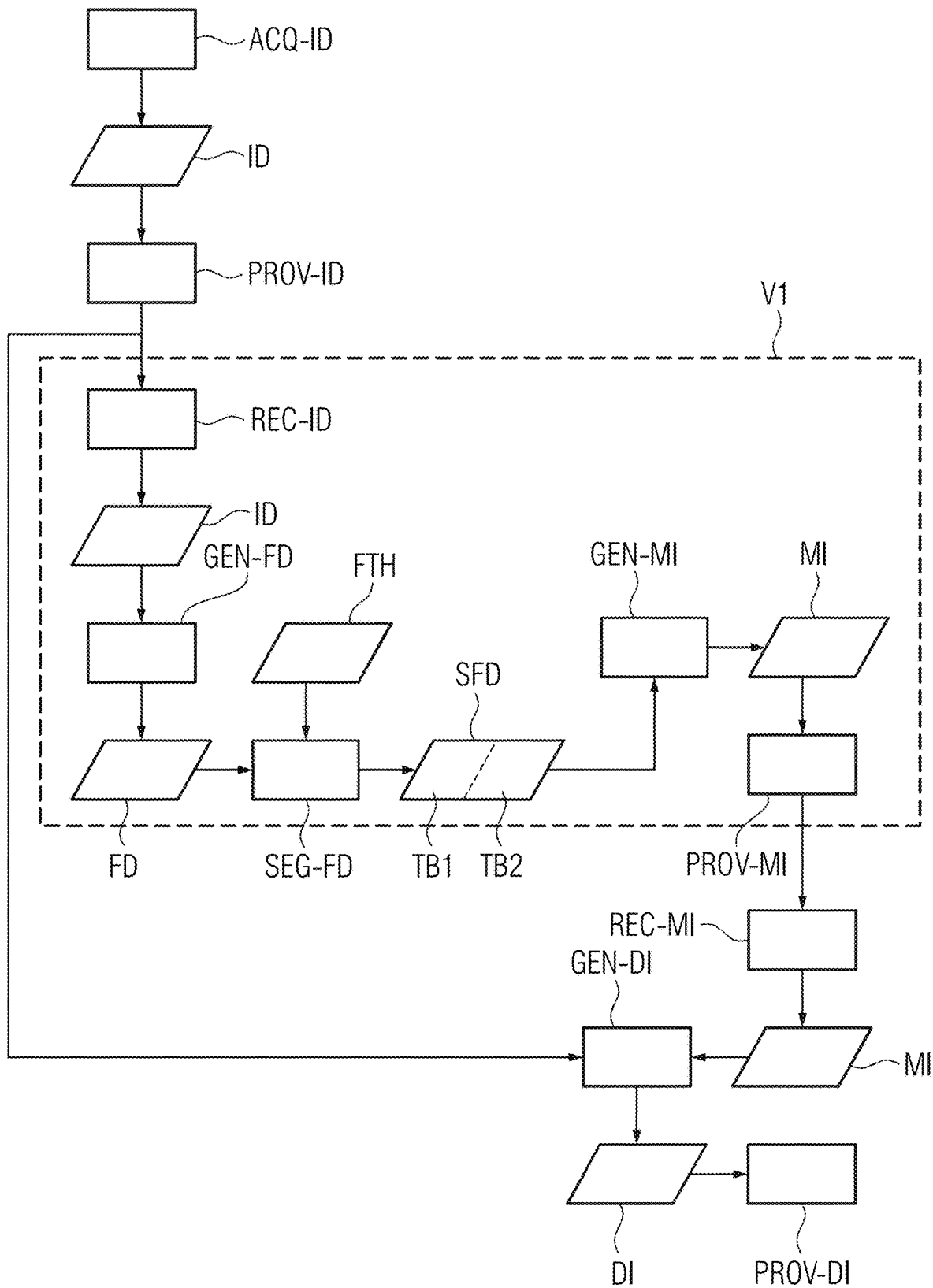
FIG. 5 depicts a schematic representation of an embodiment of a method for providing a differential image.

FIG. 5 schematically represents an embodiment of the method for providing a differential image. In a first step s1), the medical image data ID including a temporal dimension may be acquired ACQ-ID by a medical imaging device. Furthermore, the medical image data ID may be provided PROV-ID for step a) of the method V1 for providing a mask image PROV-MI. By applying the method V1 for providing a mask image PROV-MI to the image data ID, the mask image MI may be received REC-MI in step s2). Hereafter in a step s3), the differential image DI may be generated GEN-DI by subtracting and/or multiplying the mask image MI by the medical image data ID. In a fourth step s4), the differential image DI may be provided PROV-DI.

Figure 6:
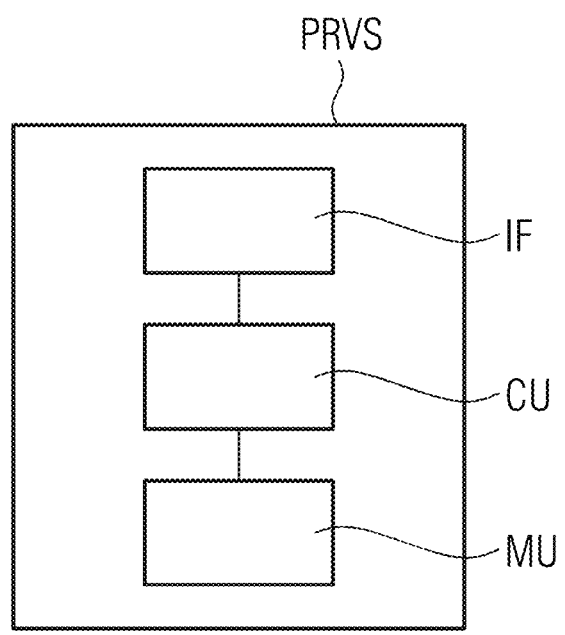
FIG. 6 depicts a schematic representation of a provision unit according to an embodiment.

FIG. 6 schematically depicts a provision unit PRVS including an interface IF, an arithmetic unit CU and a memory unit MU. The provision unit PRVS may be configured to carry out a method for providing a mask image PROV-MI and/or a method for providing a differential image PROV-DI in that the interface IF, the arithmetic unit CU and the memory unit MU are configured to carry out the corresponding method steps.

The interface IF may be configured for carrying out steps a), a2), a3) and/or e) of the method for providing a mask image PROV-MI. Furthermore, the interface IF may be configured for carrying out steps s2) and s4) of the method for providing a differential image PROV-DI. Furthermore, the arithmetic unit CU and/or the memory unit MU may be configured for carrying out the remaining steps of the method.

The provision unit PRVS may be, for example, a computer, a microcontroller or an integrated circuit. Alternatively, the provision unit PRVS may be a real or virtual group of computers (an English technical term for a real group is a "Cluster", an English technical term for a virtual group is a "Cloud"). The provision unit PRVS may also be configured as a virtual system, that is run on a real computer or a real or virtual group of computers (virtualization).

An interface IF may be a hardware or software interface (for example, PCI bus, USB or Firewire). An arithmetic unit CU may include hardware elements or software elements, for example a microprocessor or what is known as an FPGA (English acronym for "Field Programmable Gate Array"). A memory unit MU may be implemented as a non-permanent working memory (Random Access Memory, RAM for short) or as a permanent mass memory (hard disk, USB stick, SD card, Solid State Disk).

The interface IF may include, for example, a plurality of sub-interfaces, that carry out the different steps of the respective method. In other words, the interface IF may also be conceived as a large number of interfaces IF. The arithmetic unit CU may include, for example, a plurality of sub-arithmetic units, that carry out different steps of the respective method. In other words, the arithmetic unit CU may also be conceived as a large number of arithmetic units CU.

Figure 7:
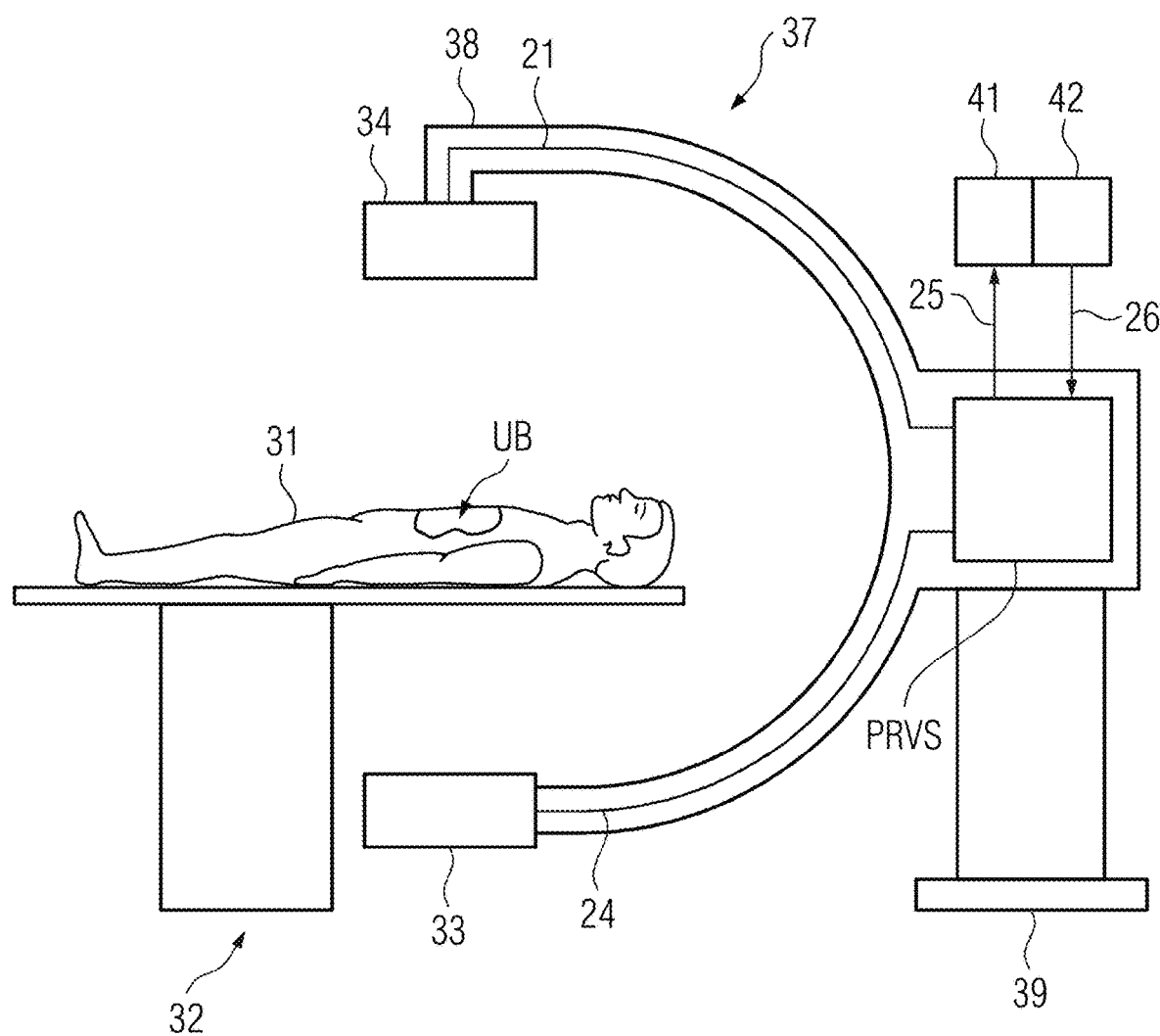
FIG. 7 depicts a schematic representation of a medical C-arm X-ray device as an example of a medical imaging device according to an embodiment.

FIG. 7 schematically represents a medical C-arm X-ray device 37 as an example of a medical imaging device. the medical C-arm X-ray device 37 may include a provision unit PRVS, for example for control of the medical C-arm X-ray device 37. The medical C-arm X-ray device 37, for example the provision unit PRVS, is configured to carry out a method for providing a mask image PROV-MI and/or a method for providing a differential image PROV-DI.

The medical C-arm X-ray device 37 also includes a detector unit 34 and an X-ray source 33. For acquisition of the medical image data ID the arm 38 of the C-arm X-ray device 37 may be mounted to move around one or more axes. Furthermore, the medical C-arm X-ray device 37 may include a movement apparatus 39, that provides a movement of the C-arm X-ray device 37 in the space, for example a wheel system and/or rail system.

For acquisition of the medical image data ID from the examination region UB of the examination object 31 arranged on a patient supporting facility 32 the provision unit PRVS may send a signal 24 to the X-ray source 33. The X-ray source 33 may then emit an X-ray beam bundle, for example a cone beam and/or fan beam and/or parallel beam. When the X-ray beam bundle, after an interaction with the examination region UB of the examination object 31 to be mapped, strikes a surface of the detector unit 34, the detector unit 34 may send a signal 21 to the provision unit PRVS. The provision unit PRVS may receive REC-ID the medical image data ID, for example on the basis of the signal 21.

Furthermore, the medical C-arm X-ray device 37 may include an input unit 42, for example a keyboard, and/or a presentation unit 41, for example a monitor and/or display. The input unit 42 may be integrated in the presentation unit 41, for example in the case of a capacitive and/or resistive input display. An input by an operator at the input unit 42 may provide, for example supplementary, control of the medical C-arm X-ray device 37, for example of a method. For this, the input unit 42 may send, for example, a signal 26 to the provision unit PRVS.

Furthermore, the presentation unit 41 may be configured to display information and/or graphical representations of information of the C-arm X-ray device 37 and/or the provision unit PRVS and/or further components. For this, the provision unit PRVS may send, for example, a signal 25 to the presentation unit 41. For example, the presentation unit 41 may be configured for display of a graphical representation of the medical image data ID and/or the frequency data set FD and/or the mask image MI and/or the differential image DI.

The schematic representations contained in the described figures do not depict any kind of scale or size ratio.

In conclusion, reference is made once again to the fact that the methods described in detail above and the represented apparatuses are merely embodiments, that may be modified in a wide variety of ways by a person skilled in the art without departing from the scope of the invention. Furthermore, use of the indefinite article "a" or "an" does not preclude the relevant features from also being present several times. Similarly, the terms "unit" and "element" do not preclude the relevant components from consisting of a plurality of cooperating sub-components, that may optionally also be spatially distributed.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for providing a mask image, the method comprising:
receiving medical image data including a temporal dimension;
generating a frequency data set including one or more data points with in each case one frequency value by applying a Fourier transform to the medical image data, wherein the Fourier transform is applied at least along the temporal dimension, wherein frequency values of the one or more data points of the frequency data set include a frequency spectrum relating to a time intensity curve of an image point corresponding therewith;
segmenting the frequency data set into a first sub-area and a second sub-area based on at least a frequency threshold value that comprises a transition frequency between two different movement states, the transition frequency determined based at least in part on the frequency spectrum;
generating the mask image by applying an inverse Fourier transform to the first sub-area, the second sub-area, or the first sub-area and the second sub-area of the frequency data set; and
providing the mask image.

2. The method of claim 1, wherein generating the mask image comprises applying the inverse Fourier transform to the first sub-area and the second sub-area of the frequency data set, wherein frequency values of at least one of either the first sub-area or the second sub-area is adjusted.

3. The method of claim 1, wherein generating the frequency data set comprises applying the Fourier transform along at least one spatial axis, wherein segmenting of the frequency data set is based on at least one first frequency threshold value in respect of a temporal frequency and at least one second frequency threshold value in respect of a spatial frequency.

4. The method of claim 1, further comprising:
identifying a medical object, an anatomical structure, or the medical object and the anatomical structure in the medical image data; and
determining data points corresponding to the identified medical object and/or the anatomical structure in the frequency data set, wherein corresponding data points are excluded from segmentation.

5. The method of claim 4, wherein a subset of data points of the frequency data set around the corresponding data points is also determined, wherein the subset of data points is excluded from segmentation.

6. The method of claim 4, wherein identifying further comprises receiving an object parameter, a structure parameter, or the object parameter and the structure parameter,
wherein the object parameter includes information relating to the medical object,
wherein the structure parameter includes information relating to the anatomical structure, wherein the corresponding data points are determined on the basis of the object parameter, the structure parameter, or the object parameter and the structure parameter.

7. The method of claim 1, wherein receiving medical image data further comprises registering the medical image data.

8. The method of claim 1, wherein the medical image data maps at least partially a joint examination region of an examination object, wherein receiving the medical image data further comprises receiving a physiological signal, a movement signal, or the physiological signal and the movement signal of the examination object;
wherein the at least one frequency threshold value is specified on the basis of the physiological signal, the movement signal, or the physiological signal and the movement signal of the examination object.

9. The method of claim 1, further comprising:
generating a differential image by subtracting, multiplying, or subtracting and multiplying the mask image and the medical image data; and
providing the differential image.

10. A system comprising:
a medical imaging device configured to acquire medical image data including a temporal dimension;
a provision unit configured to generate a frequency data set including one or more data points with in each case one frequency value by applying a Fourier transform to the medical image data, wherein the Fourier transform is applied at least along the temporal dimension, wherein frequency values of the one or more data points of the frequency data set include a frequency spectrum relating to a time intensity curve of an image point corresponding therewith, the provision unit further configured to segment the frequency data set into a first sub-area and a second sub-area based on at least a frequency threshold value that comprises a transition frequency between two different movement states, the transition frequency determined based at least in part on the frequency spectrum, and generate a mask image by applying an inverse Fourier transform to the first sub-area, the second sub-area, or the first sub-area and the second sub-area of the frequency data set.

11. The system of claim 10, wherein the provision unit is configured to generate the mask image by applying the inverse Fourier transform to the first sub-area and the second sub-area of the frequency data set, wherein frequency values of at least one of either the first sub-area or the second sub-area is adjusted.

12. The system of claim 10, wherein the provision unit is configured to generating the frequency data set comprises applying the Fourier transform along at least one spatial axis, wherein segmenting of the frequency data set is based on at least one first frequency threshold value in respect of a temporal frequency and at least one second frequency threshold value in respect of a spatial frequency.

13. The system of claim 10, wherein the provision unit is further configured to generate a differential image by subtracting, multiplying, or subtracting and multiplying the mask image and the medical image data.

14. A provision unit comprising:
a processor; and
a memory coupled to the processor, the memory configured to store machine-readable instructions executable by the processor, the machine-readable instructions comprising instructions to:
receive medical image data including a temporal dimension;
generate a frequency data set including one or more data points with in each case one frequency value by applying a Fourier transform to the medical image data, wherein the Fourier transform is applied at least along the temporal dimension, wherein frequency values of the one or more data points of the frequency data set include a frequency spectrum relating to a time intensity curve of an image point corresponding therewith;
segment the frequency data set into a first sub-area and a second sub-area based on at least a frequency threshold value that comprises a transition frequency between two different movement states the transition frequency determined based at least in part on the frequency spectrum;
generate a mask image by applying an inverse Fourier transform to the first sub-area, the second sub-area, or the first sub-area and the second sub-area of the frequency data set; and
provide the mask image.

15. The provision unit of claim 14, wherein the machine-readable instructions to generate the mask image comprise machine-readable instructions to apply the inverse Fourier transform to the first sub-area and the second sub-area of the frequency data set, wherein frequency values of at least one of either the first sub-area or the second sub-area are adjusted.

16. The provision unit of claim 14, wherein the machine-readable instructions to generate the frequency data set comprise machine-readable instructions to apply the Fourier transform along at least one spatial axis, wherein segmenting of the frequency data set is based on at least one first frequency threshold value in respect of a temporal frequency and at least one second frequency threshold value in respect of a spatial frequency.

17. The provision unit of claim 14, wherein the machine-readable instructions further comprise instructions to:
identify a medical object, an anatomical structure, or the medical object and the anatomical structure in the medical image data; and
determine data points corresponding to the identified medical object and/or the anatomical structure in the frequency data set, wherein corresponding data points are excluded from segmentation.

18. The provision unit of claim 17, machine-readable instructions further comprise instructions to determine a subset of data points of the frequency data set around the corresponding data points, wherein the subset of data points is excluded from segmentation.

19. The provision unit of claim 17, wherein the machine-readable instructions for identifying further comprises instructions to receive an object parameter, a structure parameter, or the object parameter and the structure parameter,
wherein the object parameter includes information relating to the medical object,
wherein the structure parameter includes information relating to the anatomical structure, wherein the corresponding data points are determined on the basis of the object parameter, the structure parameter, or the object parameter and the structure parameter.

20. The provision unit of claim 14, wherein the machine-readable instructions further comprise instructions to:
generate a differential image by subtracting, multiplying, or subtracting and multiplying the mask image and the medical image data; and
provide the differential image.

\* \* \* \* \*